United States Patent [19]

DeMario

[11] Patent Number: 4,923,669
[45] Date of Patent: May 8, 1990

[54] NUCLEAR FUEL ROD GRID SPRING AND DIMPLE STRUCTURES HAVING CHAMFERED EDGES FOR REDUCED PRESSURE DROP

[75] Inventor: Edmund E. DeMario, Columbia, S.C.

[73] Assignee: Westinghouse Electric Corp., Pittsburgh, Pa.

[21] Appl. No.: 312,288

[22] Filed: Feb. 21, 1989

[51] Int. Cl.$^5$ .............................................. G21C 3/34
[52] U.S. Cl. ..................................... 376/442; 376/438
[58] Field of Search ........................ 376/438, 441, 442

[56] References Cited

U.S. PATENT DOCUMENTS

| 3,769,159 | 10/1973 | Zinn et al. | 176/78 |
|---|---|---|---|
| 4,268,356 | 5/1981 | Kmonk et al. | 176/78 |
| 4,389,369 | 6/1983 | Bryan | 376/442 |
| 4,426,355 | 1/1984 | Burger | 376/442 |
| 4,474,730 | 10/1984 | Hellman et al. | 376/462 |
| 4,492,844 | 1/1985 | Kobuck et al. | 219/121 |
| 4,576,786 | 3/1986 | DeMario | 376/439 |
| 4,585,615 | 4/1986 | DeMario | 376/442 |
| 4,659,542 | 4/1987 | Kerrey | 376/442 |
| 4,702,881 | 10/1987 | Weiland et al. | 376/442 |
| 4,744,942 | 5/1988 | Farrari et al. | 376/442 |
| 4,756,878 | 7/1988 | King et al. | 376/439 |
| 4,803,043 | 2/1989 | DeMario | 376/442 |

Primary Examiner—Donald P. Walsh

[57] ABSTRACT

A nuclear fuel assembly grid includes a multiplicity of dimple and spring structures for engaging fuel rods extending through the cells of the grid. Each of the dimple and spring structures have a pair of outer portions and a middle portion with opposite lengthwise edges thereon. The edges of the middle portions of the dimple structures and the outer and middle portions of the spring structures have one-sided chamfers defined thereon, whereas the edges of the outer portions of the dimple structures have double-sided chamfers defined thereon. The one-sided chamfers are longer than the double-sided chamfers.

22 Claims, 4 Drawing Sheets

NUCLEAR FUEL ROD GRID SPRING AND DIMPLE STRUCTURES HAVING CHAMFERED EDGES FOR REDUCED PRESSURE DROP

CROSS REFERENCE TO RELATED APPLICATIONS

Reference is hereby made to the following applications dealing with related subject matter and assigned to the assignee of the present invention:

1. "Nuclear Fuel Spacer Grid With Improved Grid Straps" by Edmund E. DeMario, assigned U.S. Ser. No. 473,516 and filed Mar. 9, 1983. (W. E. 50,973)

2. "Partial Grid For A Nuclear Reactor Fuel Assembly" by Edmund E. DeMario, assigned U.S. Ser. No. 564,049 and filed Dec. 21, 1983. (W. E. 51,313)

3. "A Low Pressure Drop Grid For A Nuclear Reactor Fuel Assembly" by Edmund E. DeMario et al, assigned U.S. Ser. No. 567,448 and filed Dec. 30, 1983. (W. E. 51,417)

4. "A Coolant Flow Mixer Grid For A Nuclear Reactor Fuel Assembly" by Edmund E. DeMario et al, assigned U.S. Ser. No. 567,450 and filed Dec. 30, 1983. (W. E. 50,974)

5. "Nuclear Fuel Rod Support Grid With Improved Multiple Dimple Arrangement" by John A. Rylatt, assigned U.S. Ser. No. 729,387 and filed May 1, 1985. (W. E. 52,505)

6. "Nuclear Fuel Rod Grid Spring And Dimple Structures" by Edmund E. DeMario et al, assigned U.S. Ser. No. 125,514 and filed Nov. 25, 1987, a continuation-in-part of copending U.S. Ser. No. 053,990, filed May 22, 1987, now abandoned. (W. E. 53,856-I)

7. "Nuclear Fuel Rod Grid With Modified Diagonal Spring Structures" by Edmund E. DeMario, assigned U.S. Ser. No. 168,060 and filed Mar. 14, 1988. (W. E. 54,277)

BACKGROUND OF THE INVENTION

1. Field of the Invention

The present invention relates generally to nuclear fuel assemblies and, more particularly, is concerned with a nuclear fuel rod grid with spring and dimple structures having chamfered edges for reduced pressure drop.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Representative grid designs include those of some of the patent applications cross-referenced above.

One popular conventional grid design, being illustrated and described in U.S. Pat. No. 4,492,844 to Kobuck et al and assigned to the assignee of the present invention, includes a multiplicity of interleaved inner and outer straps having an egg-crate configuration forming a multiplicity of cells which individually accept the fuel rods and control rod guide thimbles. The cells of each grid which accept and support the fuel rods at a given axial location therealong typically use relatively resilient springs and/or relatively rigid protrusions (called dimples) formed into the metal of the interleaved straps. The springs and dimples of each grid cell project toward the center of the cell and frictionally engage or contact the respective fuel rod extending through the cell. Additionally, the outer straps are attached together and peripherally enclose the inner straps to impart strength and rigidity to the grid.

However, several drawbacks arise from this particular grid design. The vertical orientation and configuration of the fuel rod engaging springs require that the springs and thus the grid be of substantial height in order for the springs to have the desired amount of resiliency to function properly. This requirement increases the amount of parasitic structural material utilized in the fuel assembly and the pressure drop through the fuel assembly. Also, the projection of the springs and dimples into the grid cells and thus across the upward path of coolant flow along the fuel rods and through the grid cells further increases the pressure drop through the fuel assembly.

A recent U.S. Pat. No. to King et al (4,756,878) has proposed an approach to reducing pressure drop of cooling liquid through a grid by convexly contouring the upstream (usually the lower) edges of the grid straps and by tapering the downstream (usually the upper) strap edges. In particular, the upstream grid strap edges are made streamlined to semicylindrical or semiellipsoidal by any of various techniques, such as beveling (coining) and etching, applying abrasive material, or electron or laser beam melting.

While the approach of the above-cited King et al patent may be a step in the right direction, it falls short of providing an optimum solution to the problem of reducing pressure drop caused by fuel rod spacer grids in a nuclear fuel assembly It is perceived by the inventor herein that a need still exists for an improved grid structure which will avoid the above drawbacks without presenting new ones in their place.

SUMMARY OF THE INVENTION

The present invention provides a fuel rod grid structure designed to satisfy the aforementioned needs. The improved grid of the present invention includes dimple and spring structures with lengthwise edge chamfers which provide significant reductions in pressure drop of coolant flow through the grid. Some of the edges contain double-sided chamfers, whereas others have single- or one-sided chamfers.

Accordingly, the present invention is directed to a plurality of fuel rod engaging dimple and spring structures in a nuclear fuel rod grid. The grid includes a plurality of inner and outer straps being interleaved with one another to form a matrix of hollow cells, each cell for receiving one fuel rod and being defined by pairs of opposing wall sections of the straps which wall sections are shared with adjacent cells. Each cell has a central longitudinal axis defining a coolant flow direction through the cell.

Each dimple structure of the present invention formed on each wall section of the inner straps, includes a pair of spaced apart opposite outer portions and a middle portion therebetween. The outer portions are integrally attached at their outer ends to the respective wall section and extend in opposite inclined relation to the wall section toward and in alignment with one another and in generally transverse relation to the coolant flow direction through the one cell. The middle portion is disposed between and integrally connected at its outer ends with respective inner ends of the outer portions, and extends in generally transverse relation to the coolant flow direction through the one cell. Each of the outer portions has a pair of opposite edges running lengthwise thereof with each edge having a chamfer defined thereon. The middle portion has a pair of opposite edges running lengthwise thereof with each edge having a chamfer defined thereon. More particularly, each edge of each of the outer portions has a double-sided chamfer, whereas each edge of the middle portion has a one-sided chamfer. The one-side chamfer is longer than the double-sided chamfer.

Each spring structure of the present invention formed on each wall section of the inner straps at a location between and spaced from the dimple structures, includes a pair of spaced apart opposite outer portions and a middle portion therebetween. The outer portions are integrally attached at their outer ends to the respective wall section and extend in opposite inclined relation to the wall section toward and in alignment with one another and in diagonal relation to the coolant flow direction through the one cell. The middle portion is disposed between and integrally connected at its outer ends with respective inner ends of the outer portions, and extends in diagonal relation to the coolant flow direction through the one cell. Each of the outer portions has a pair of opposite edges running lengthwise thereof with each edge having a chamfer defined thereon. The middle portion has a pair of opposite edges running lengthwise thereof with each edge having a chamfer defined thereon. More particularly, each edge of each of the outer portions and of the middle portion of the spring structure has a one-sided chamfer.

Each inner strap of the grid also includes a pair of cutout portions in each wall section thereof defining windows respective along the opposite edges of the outer and middle portions of the spring structure. The cutout portions have edges defining the windows with the spring structure which have double-sided chamfers defined thereon.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged fragmentary horizontal sectional view taken along line 4—4 of FIG. 3, showing the configuration of an upper edge of a dimple structure on the inner strap of the grid in accordance with the present invention.

FIG. 5 is an enlarged fragmentary horizontal sectional view taken along line 5—5 of FIG. 3, showing the configuration of a lower edge of the dimple structure in accordance with the present invention.

DETAILED DESCRIPTION OF THE INVENTION

Figure 1:
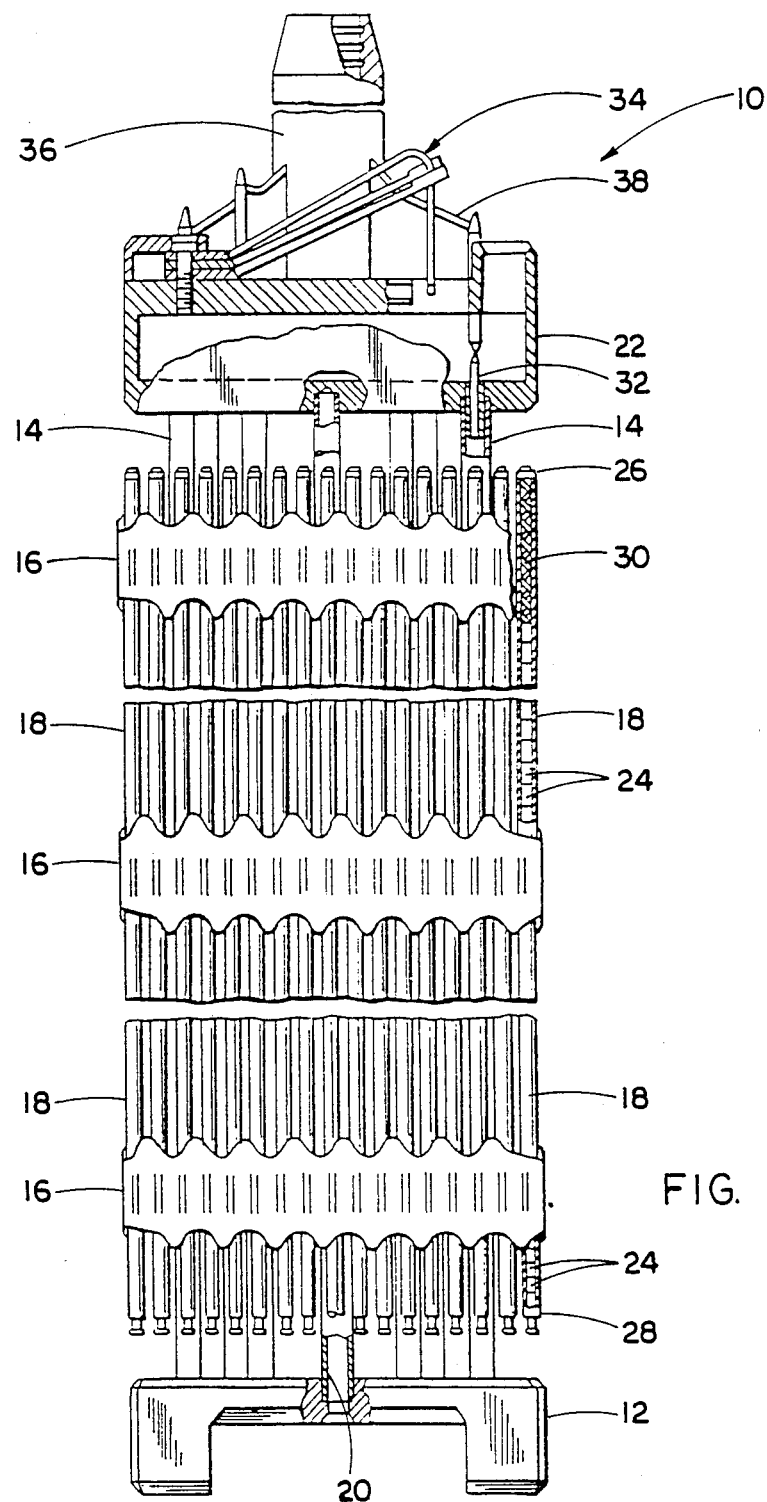
FIG. 1 is an elevational view, partly in section, of a fuel assembly which employs fuel rod grids having the improved spring and dimple structures of the present invention, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 constructed in accordance with the principles of the present invention, as will be described in detail below. The grids 16 are axially spaced along and supported by the guide thimbles 14. The assembly 10 also includes a plurality of elongated fuel rods 18 transversely spaced and supported in an organized array by the grids 16. Also, the assembly 10 has an instrumentation tube 20 located in the center thereof and an upper end structure or top nozzle 22 attached to the upper ends of the guide thimbles 14. With such arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has associated therewith a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Figure 2:
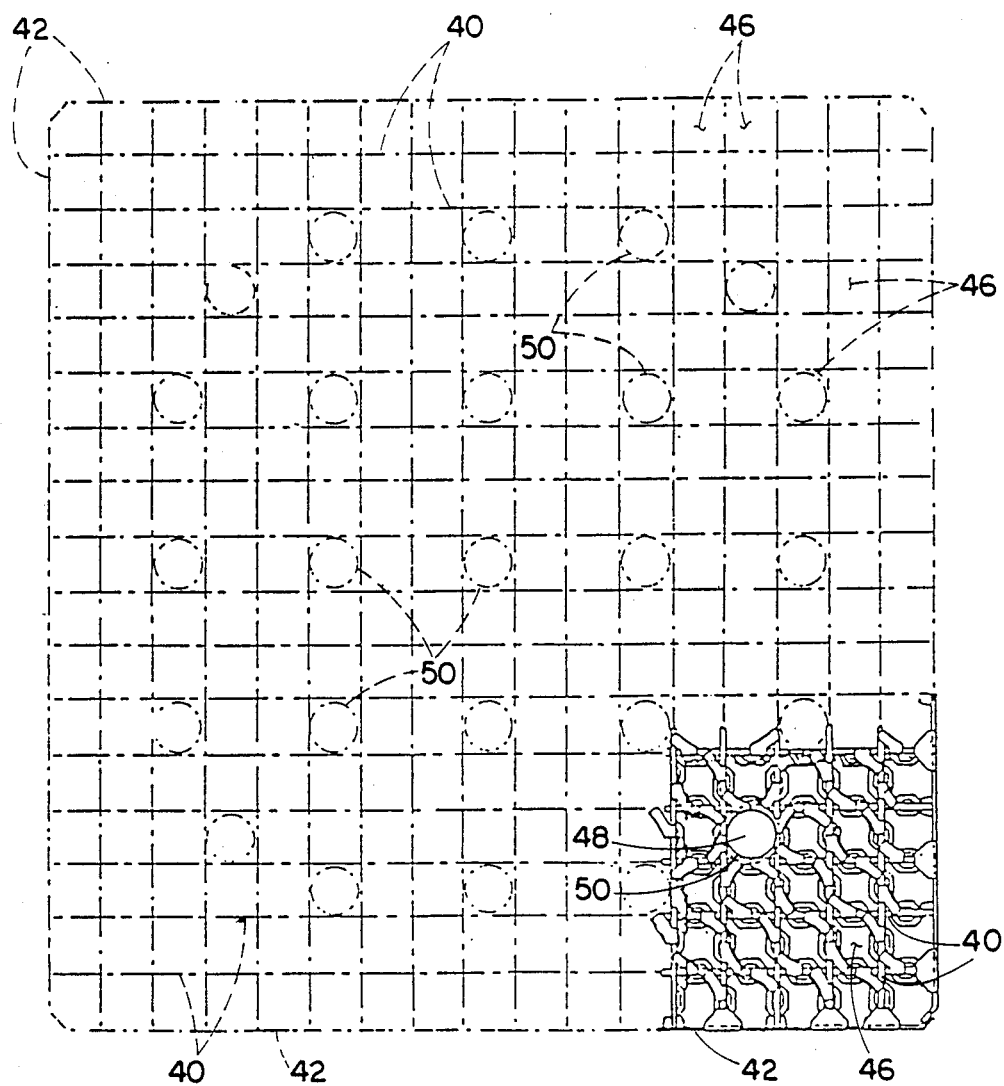
FIG. 2 is an enlarged top plan view, as seen along line 2—2 of FIG. 1, of the fuel rod grid removed from the fuel assembly.
Figure 3:
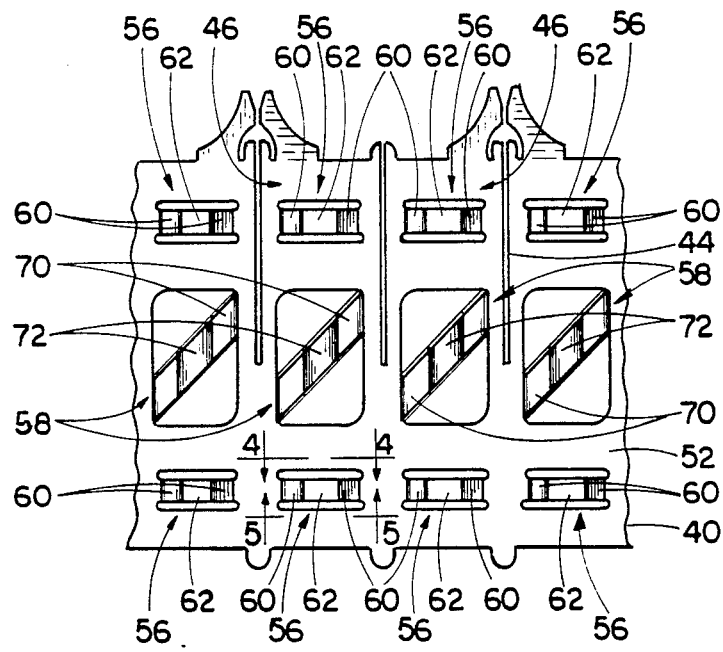
FIG. 3 is an enlarged fragmentary side elevational view of an inner strap of the grid of FIG. 2.
Figure 4:
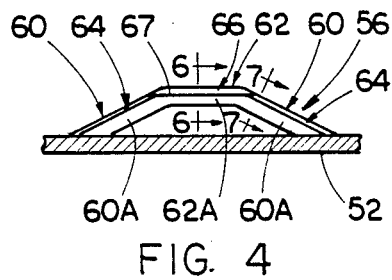
FIGS. 4 and 5 are elevational views of end portions of the outer straps which meet to form the corner of the grid as seen along respective lines 4—4 and 5—5 of FIG. 3.
Figure 5:
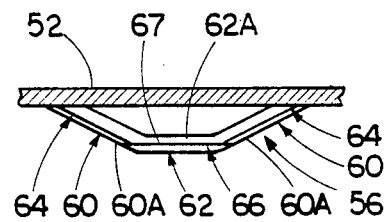
Figure 6:
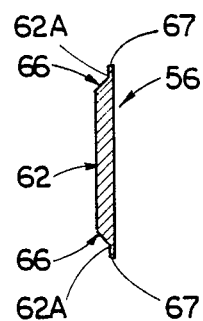
FIG. 6 is an enlarged fragmentary vertical sectional view taken along line 6—6 of FIG. 4, showing the configuration of a middle portion of the dimple structure in accordance with the present invention.
Figure 7:
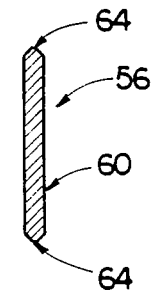
FIG. 7 is an enlarged fragmentary vertical sectional view taken along line 7—7 of FIG. 4, showing the configuration of one of a pair of opposite inclined outer portions of the dimple structure in accordance with the present invention.
Figure 8:
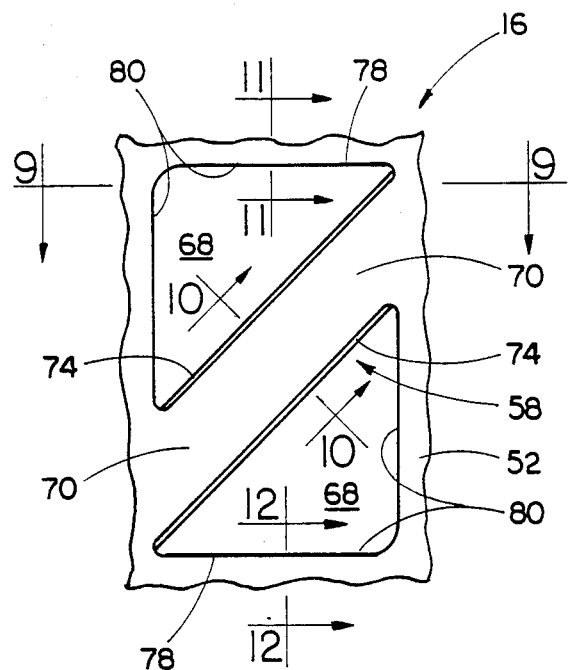
FIG. 8 is an enlarged fragmentary portion of the side elevational view in FIG. 3, showing the configuration of a spring structure on the inner strap of the grid in accordance with the present invention before the spring structure is bent into its final configuration.
Figure 10:
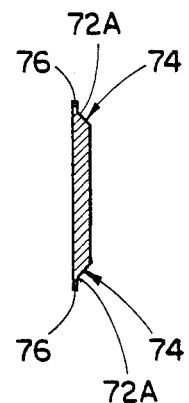
FIG. 10 is an enlarged cross-sectional view taken along line 10—10 of FIG. 8, showing the configuration of the spring structure in accordance with the present invention.
Figure 9:
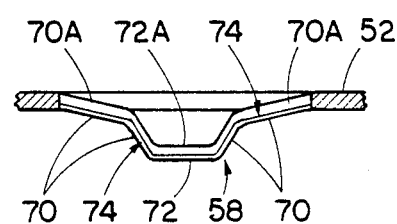
FIG. 9 is a sectional view taken along line 9—9 of FIG. 8, showing the configuration of the spring structure in accordance with the present invention after the spring structure is bent into its final configuration.
Figure 11:
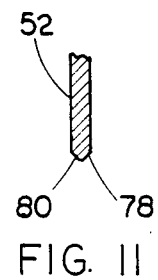
FIGS. 11 and 12 are enlarged fragmentary sectional views taken respectively along lines 11—11 and 12—12 of FIG. 8, showing edge portions of the grid strap defining windows above and below the spring structure.
Figure 12:
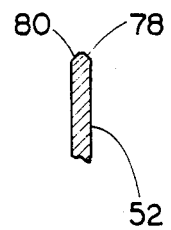

Referring now to FIGS. 2 and 3, there is shown a preferred embodiment of the transverse fuel rod grid 16 constructed in accordance with the present invention. Basically, the grid 16 includes a plurality of inner and outer straps 40,42 having slots 44 by which the straps are interleaved with one another in an egg-crate configuration to form a matrix of hollow cells 46 and a plurality of openings 48. The hollow cells 46 of the grid 16 receive therethrough respective ones of the fuel rods 18, whereas the openings 48 of the grid 16 have sleeves 50 inserted therein and attached to the inner straps 40 by which the grid 16 is disposed along and attached to the guide thimbles 14.

Each cell 46 receiving one fuel rod 18 has a central longitudinal axis A therethrough defined generally parallel to pairs of opposing wall sections. The wall sections 52 compose the inner straps 40, whereas the wall sections 54 compose the outer straps 42. The inner strap wall sections 52 are shared with adjacent cells. The wall sections 54 of the outer straps 42 each has a pair of horizontally extending and vertically spaced fuel rod engaging dimple structures (not shown) integrally formed thereon in association with each cell 46. Similarly, the wall sections 52 of the inner straps 40 also each has a pair of horizontally extending and vertically spaced fuel rod engaging dimple structures 56 integrally formed thereon in association with each cell 46. One of the dimple structures 56 on each wall section 52 of the inner straps 40 is located above a diagonally extending spring structure 58 of the present invention, whereas the other dimple 56 is located below it. The dimple structures 56 extending away from the wall section 52 in an opposite direction to that of the spring structure 58 and thus into a grid cell 46 adjacent to the grid cell of the spring structure. Each cell 46 of the grid 16 has associated with it four dimple structures 56 and two spring structures 58 such that each fuel rod 18 in each cell 46 is contacted at six circumferentially and axially displaced locations thereon.

Grid Dimple and Spring Structures with Chamfered Edges

As seen in FIGS. 4–7, each fuel rod engaging dimple structure 56 is composed of resiliently yieldable flexible material of the inner straps 40, such as stainless steel or zircaloy metal. The components of the dimple structure 56, which will be described next, are integrally formed, such as by conventional stamping and coining operation, from each wall section 52 of the inner straps 40 in association with each cell 46 of the grid 16.

The components of each dimple structure 56 include a pair of spaced apart opposite leg or outer portions 60 and a middle portion 62 therebetween. The outer portions 60 of the dimple structure 56 are integrally attached at their outer ends to the respective wall section 52. The outer portions 60 extend in opposite inclined relation to the wall section 52 away therefrom and toward and in alignment with one another. In view of the orientation of the dimple structure 56, the outer portions 60 extend in generally transverse relation to the coolant flow direction through the cell 46. The middle portion 62 of the dimple structure 56 is disposed between and integrally connected at its outer ends with respective inner ends of the outer portions 60. The middle portion 62 likewise extends in generally transverse relation to the coolant flow direction through the one cell.

The outer portions 60 and the middle portion 62 of each dimple structure 56 have pairs of opposite edges 60A and 62A running lengthwise thereof which merge into one another. In accordance with the present invention, each outer portion edge 60A has a chamfer 64 defined thereon, preferably a double-sided chamfer, and the middle portion edge 62A has a chamfer 66 defined thereon, but preferably a single- or one-sided chamfer. The one-sided chamfer 66 is longer than the double-sided chamfer 64, for instance about 2 times longer. Also, the outer and middle portions 60, 62 are of generally planar configuration and each side of the respective chamfers 64, 66 is at an angle within the range of $45 +-5$ degrees to the plane of the respective outer and middle portions. Further, each edge 62A of the middle portion 62 also has a rim 67 defined thereon along and outwardly of the one-sided chamfer 66 thereon.

As seen in FIGS. 8–12, like each dimple structure 56, each fuel rod engaging spring structure 58 too is composed of resiliently yieldable flexible material of the inner straps 40, such as stainless steel or zircaloy metal. The components of the spring structure 58, which will be described next, are integrally formed, such as by conventional stamping and coining operation, from each wall section 52 of the inner straps 40 in association with each cell 46 of the grid 16. Also, each inner grid strap wall section 52 has a pair of cutout portions defining windows 68 at opposite sides of the spring structure 58. In a general overall sense, the spring structure 58 is formed to extend diagonally between the windows 68 of the respective wall section 52 and integrally connect at diagonally opposite upper and lower locations on upper and lower portions of the walls sections 52.

Basically, each modified diagonal spring structure 60 is integrally composed of a pair of upper and lower opposite outer portions 70 and a middle inner portion 72 therebetween. The spaced apart upper and lower outer portions 70 of each spring structure 58 are integrally attached at their respective outer ends to the respective upper and lower portions of the wall section 52. The upper and lower outer portions 70 extend in alignment with one another and in generally diagonal relation, preferably at forty-five degrees, to the central longitudinal axis A of and coolant flow direction through the respective one grid cell 46. The middle inner portion 72 of each spring structure 58 is disposed between and integrally connected at its opposite outer ends with respective inner ends of the upper and lower outer portions 70. The middle inner portion 74 also extends in generally diagonal relation to the direction of coolant flow through the respective one cell 46.

More particularly, the outer portions 70 and the middle portion 72 of the spring structure 58 have pairs of opposite edges 70A and 72A running lengthwise thereof which merge into one another. Each outer portion edge 70A and the middle portion edge 72A all have a chamfer 74 defined thereon, preferably a single- or one-sided chamfer. The one-sided chamfers 66, 74 are substantially identical. Also, the outer and middle portions 70, 72 of the spring structure 58 are of generally planar configuration and the side of the chamfer 74 is at an angle within the range of 45+ −5 degrees to the plane of the respective outer and middle portions. Further, each edge 70,72A of the outer and middle portions 70,72 also has a rim 76 defined thereon along and outwardly of the one-sided chamfer 74.

Experimentation shows that placement of the double-sided chamfers 64 on the opposite edges of the outer portions 60 of the dimple structures 56 reduces pressure drop by a significant amount, for instance up to ten percent. Because of the small surface areas involved this result was surprising and unexpected. Chamfering both opposite edges provides better flow characteristics across the dimple structure. A reduction of pressure drop of about the same magnitude was achieved by the chamfers 74 on the opposite edges of the spring structures. Double-sided chambers 78 are also provided on the edges 80 of the windows 68. Referring to FIGS. 4–7, it can be clearly seen that the sides defining each of the chamfers 64 and 66 on the respective lengthwise edges of the dimple structures 56 extend in inclined relation to and solely between and within extensions of the spaced apart planes of opposite surfaces on the portions of the dimple structures having the chamfered edges thereon. Also, referring to FIGS. 9–10, it can be clearly seen that the sides defining each of the chamfers 74 on the respective lengthwise edges of the spring structures 58 extend in inclined relation to and solely between and within extensions of the spaced apart planes of opposite surfaces on the portions of the spring structures having the chamfered edges thereon.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed:

1. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis defining a coolant flow direction through said cell, at least fuel rod engaging dimple structure of resiliently yieldable material being integrally formed on each wall section of said inner straps, said dimple structure comprising:

(a) a pair of spaced apart opposite outer portions being integrally attached at their outer ends to said respective wall section and extending in opposite inclined relation to said wall section toward and in alignment with one another and in generally transverse relation to the coolant flow direction through said one cell; and (b) a middle portion disposed between and integrally connected at its outer ends with respective inner ends of said outer portions, said middle portion extending in generally transverse relation to the coolant flow direction through said one cell;

(c) each of said outer portions having a pair of opposite edges running lengthwise thereof, each outer portion edge having a chamber defined thereon;

(d) said middle portion having a pair of opposite edges running lengthwise thereof, each middle portion edge having a chamfer defined thereon;

(e) each of said chamfers on said respective lengthwise edges of said portions of said dimple structure being composed of at least one side extending in an inclined relation to and solely between and within extensions of spaced apart planes of opposite surfaces on said portions of said dimple structure having said chamfered edges thereon.

2. The grid as recited in claim 1, wherein said chamfer on each edge of each of said outer portions is a double-sided chamfer.

3. The grid as recited in claim 2, wherein each outer portion is of generally planar configuration and each side of said chamfer is at an angle within the range of 45+ −5 degrees to the plane of said outer portion.

4. The grid as recited in claim 1, wherein said chamfer on each edge of said middle portion is a one-sided chamfer.

5. The grid as recited in claim 4, wherein each edge of said middle portion also has a rim defined thereon along and outwardly of said chamfer.

6. The grid as recited in claim 4, wherein said middle portion is of generally planar configuration and said side of said chamfer is at an angle within the range of 45+ −5 degrees to the plane of said middle portion.

7. The grid as recited in claim 1, wherein said grid includes a pair of said fuel rod engaging dimple structures and a fuel rod engaging spring structure of resiliently yieldable material being integrally formed on each wall section of said inner straps at a location between and spaced from said dimple structures, said spring structure comprising:

(e) a pair of spaced apart opposite outer portions being integrally attached at their outer ends to said respective wall section and extending in opposite inclined relation to said wall section toward and in alignment with one another and in diagonal relation to the coolant flow direction through said one cell; and (f) a middle portion disposed between and integrally connected at its outer ends with respective inner ends of said outer portions, said middle portion extending in generally diagonal relation to the coolant flow direction through said one cell;

(g) each of said outer portions having a pair of opposite edges running lengthwise thereof, each outer portion edge having a chamfer defined thereon;

(h) said middle portion having a pair of opposite edges running lengthwise thereof, each middle portion edge having a chamfer defined thereon.

8. The grid as recited in claim 7, wherein said chamfer on each edge of each of said outer portions of said spring structure is a one-sided chamfer.

9. The grid as recited in claim 8, wherein each edge of each of said outer portions of said spring structure also has a rim defined thereon along and outwardly of said chamfer.

10. The grid as recited in claim 8, wherein each outer portion of said spring structure is of generally planar configuration and said side of said chamfer is at an angle within the range of 45+ −5 degrees to the plane of said outer portion.

11. The grid as recited in claim 7, wherein said chamfer on each edge of said middle portion of said spring structure is a one-sided chamfer.

12. The grid as recited in claim 11, wherein each edge of said middle portion of said spring structure also has a rim defined thereon along and outwardly of said chamfer.

13. The grid as recited in claim 11, wherein said middle portion of said spring structure is of generally planar configuration and said side of said chamfer is at an angle within the range of 45+ −5 degrees to the plane of said middle portion.

14. The grid as recited in claim 7, further comprising:
a pair of cutout portions in each wall section of said inner straps defining windows respective along said opposite edges of said outer and middle portions of said spring structure, said cutout portions having edges defining said windows with said spring structure, said edges having double-sided chamfers defined thereon.

15. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis defining a coolant flow direction through said cell, a fuel rod engaging spring structure of resiliently yieldable material being integrally formed on each wall section of said inner straps, said spring structure comprising:

(a) a pair of spaced apart opposite outer portions being integrally attached at their outer ends to said respective wall section and extending in opposite inclined relation to said wall section toward and in alignment with one another and in diagonal relation to the coolant flow direction through said one cell; and (b) a middle portion disposed between and integrally connected at its outer ends with respective inner ends of said outer portions, said middle portion extending in generally diagonal relation to the coolant flow direction through said one cell;

(c) each of said outer portions having a pair of opposite edges running lengthwise thereof, each outer portion edge having a chamber defined thereon;

(d) said middle portion having a pair of opposite edges running lengthwise thereof, each middle portion edge having a chamfer defined thereon;

(e) each of said chambers on said respective lengthwise edges of said outer portions of said spring structure being composed of at least one side extending in an inclined relation to and solely between and within extensions of spaced apart planes of opposite surfaces on said portions of said spring structure having said chamfered edges thereon.

16. The grid as recited in claim 15, wherein said chamfer on each edge of each of said outer portions is a one-sided chamfer.

17. The grid as recited in claim 16, wherein each edge of each of said outer portions also has a rim defined thereon along and outwardly of said chamfer.

18. The grid as recited in claim 16, wherein each outer portion is of generally planar configuration and said side of said chamfer is at an angle within the range of 45+ −5 degrees to the plane of said outer portion.

19. The grid as recited in claim 15, wherein said chamfer on each edge of said middle portion is a one-sided chamfer.

20. The grid as recited in claim 19, wherein each edge of said middle portion also has a rim defined thereon along and outwardly of said chamfer.

21. The grid as recited in claim 19, wherein said middle portion is of generally planar configuration and said side of said chamfer is at an angle within the range of 45+ −5 degrees to the plane of said middle portion.

22. The grid as recited in claim 15, further comprising:
a pair of cutout portions in each wall section of said inner straps defining windows respective along said opposite edges of said outer and middle portions of said spring structure, said cutout portions having edges defining said windows with said spring structure, said edges having double-sided chamfers defined thereon.

* * * * *